Oct. 6, 1953   C. W. J. HEDBERG   2,654,584
GAS COOLING CONTACT APPARATUS
Filed Sept. 29, 1950
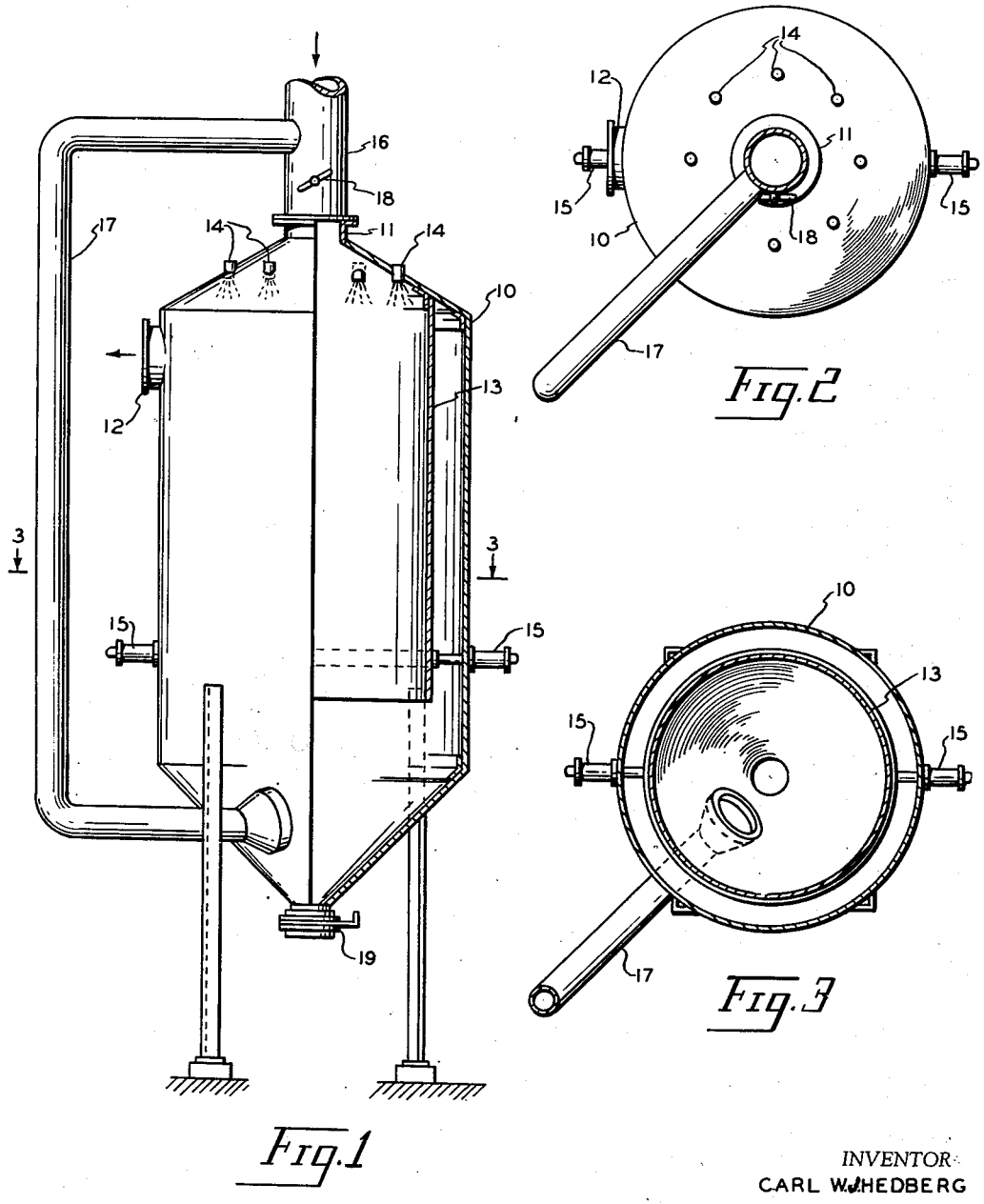
INVENTOR
CARL W. J. HEDBERG
BY Stowell + Evans
ATTORNEYS Patented Oct. 6, 1953

2,654,584

UNITED STATES PATENT OFFICE 2,654,584

GAS COOLING CONTACT APPARATUS

Carl W. J. Hedberg, Bound Brook, N. J., assignor to Research Corporation, New York, N. Y., a corporation of New Jersey Application September 29, 1950, Serial No. 187,629

2 Claims. (Cl. 261—11)

This invention relates to a method and apparatus for conditioning gases by means of water sprays.

The method and apparatus of the invention is particularly useful for the conditioning of gases prior to the removal of suspended solids therefrom by electrical precipitation. In order to obtain optimum performance in the removal of suspended solids from gases in electrical precipitators it is frequently necessary to cool and condition the gases prior to their passage into the precipitator. The desired cooling and conditioning may be effectively accomplished by directly spraying water into the gases by passing the gases through a spray tower. Cooling of gases by spray towers, however, involves the disadvantage that incomplete evaporation of the water spray frequently occurs. This results in wetting of the solid matter, particularly that portion which tends to separate out in the spray tower, causing plugging of the tower and outlet conduits.

It has now been found that these disadvantages and difficulties can be overcome by introducing a relatively hot dry gas of high evaporating power, for example, a portion of the hot incoming gases, directly into those portions of the spray chamber wherein water droplets or wetted particles tend to accumulate whereby the moisture in the droplets or particles is evaporated.

In applying the principles of the invention to down-flow cooling towers, a portion of the hot incoming gases may be diverted from the inlet conduit directly to the lower part of the tower where it evaporates any water in droplets or in wetted particles and passes out of the tower with the cooled gases.

The invention will be more particularly described with reference to the accompanying drawings in which:

Fig. 1 is a vertical elevation in partial section of a down-flow water spray cooling tower embodying the principles of the invention;

Fig. 2 is a top view of the cooling tower of Fig. 1; and

Fig. 3 is a vertical section on line 3—3 of Fig. 1.

In the drawings, 10 is the outer shell of the cooling tower provided with a gas inlet 11 and gas outlet 12, and 13 is a concentric cylindrical skirt depending from the top of shell 10. Skirt 13 encloses the spray chamber and forms with the side walls of shell 10 an annular passage for the flow of gases from the lower portion of the tower to the gas outlet. A plurality of spray heads 14 are disposed about the upper portion of the spray chamber. Rapping devices 15 pass through the shell 10 into contact with skirt 13 for shaking deposited material from the skirt.

The conduit 16 supplying hot gases to inlet 11 is connected to a point near the bottom of the tower by means of by-pass line 17. The relative portion of the hot gases which flow through the by-pass line into the lower portion of the tower may be controlled by suitable adjustment of damper 18.

Any material which collects in the bottom of the tower may be removed through a suitable valve 19 in the bottom outlet.

When the cooling tower has a flat or rounded bottom of considerable extent it is desirable to introduce the hot gases at a plurality of points in the lower portion of the tower.

It has been found that by introducing hot gases into the lower portion of the spray cooler shell in accordance with the invention it is possible to cool the hot gases down to 300° to 320° F. without drip or accumulation of moisture whereas without this provision it is difficult to cool gases with water sprays below about 400° F. without encountering water accumulation of the order of 2% or more of the water supplied.

I claim:

1. Apparatus for conditioning hot gases, comprising a vertical shell, a coaxial inner skirt member depending from the top of the shell and defining an inner spray chamber and an outer annular passage between the spray chamber and the wall of the shell, said spray chamber and said annular passage being in free communication with a lower part of the shell and each communicating at the upper part with a gas-conducting conduit, water spray means disposed in the upper part of the said spray chamber, and means for establishing flow of hot gas through said spray chamber and annular passage by way of said conduits, and means for directing a portion of the hot gas directly to the bottom of the shell.

2. Apparatus according to claim 1, wherein hot gases are introduced through the conduit communicating with the upper part of the spray chamber to flow downwardly past the water spray means and thence upwarly through the annular passage and out through the conduit communicating with the upper part of the said annular passage, and wherein a portion of the hot gases is diverted through a by-pass conduit and introduced directly into the lower part of the said shell.

CARL W. J. HEDBERG.

References Cited in the file of this patent

UNITED STATES PATENTS

| Number | Name | Date |
|---|---|---|
| 441,106 | Monsanto | Nov. 18, 1890 |
| 1,037,095 | Williams et al. | Aug. 27, 1912 |
| 1,569,860 | Hodge | Jan. 19, 1926 |
| 1,747,610 | Van Ackeren | Feb. 18, 1930 |
| 1,820,726 | Bayha et al. | Aug. 25, 1931 |
| 1,844,850 | Harmon | Feb. 9, 1932 |
| 2,031,437 | Vincent, Jr. | Feb. 18, 1936 |